(12) United States Patent
Rhee et al.

(10) Patent No.: US 12,068,495 B2
(45) Date of Patent: Aug. 20, 2024

(54) BATTERY MODULE

(71) Applicant: SK Innovation Co., Ltd., Seoul (KR)

(72) Inventors: Seo Roh Rhee, Daejeon (KR); Seung Hoon Ju, Daejeon (KR); Sol San Son, Daejeon (KR); Ha Chul Jeong, Daejeon (KR); Yang Kyu Choi, Daejeon (KR); Ha Neul Choi, Daejeon (KR)

(73) Assignee: SK ON CO., LTD., Seoul (KR)

( * ) Notice: Subject to any disclaimer, the term of this patent is extended or adjusted under 35 U.S.C. 154(b) by 106 days.

(21) Appl. No.: 17/193,133

(22) Filed: Mar. 5, 2021

(65) Prior Publication Data

US 2021/0280937 A1 Sep. 9, 2021

(30) Foreign Application Priority Data

Mar. 5, 2020 (KR) .......................... 10-2020-0027909

(51) Int. Cl.
*H01M 50/244* (2021.01)
*H01M 50/209* (2021.01)
*H01M 50/342* (2021.01)

(52) U.S. Cl.
CPC ....... *H01M 50/244* (2021.01); *H01M 50/209* (2021.01); *H01M 50/3425* (2021.01); *H01M 2200/10* (2013.01); *H01M 2200/20* (2013.01)

(58) Field of Classification Search
CPC ............. H01M 50/244; H01M 50/209; H01M 50/3425; H01M 2200/10; H01M 2200/20
USPC .......................................................... 429/99
See application file for complete search history.

(56) References Cited

FOREIGN PATENT DOCUMENTS

| CN | 110190211 A | * | 8/2019 | ............... A62C 3/07 |
|---|---|---|---|---|
| CN | 210443640 U | * | 5/2020 | |
| JP | H09-279716 A | | 10/1997 | |
| JP | 2018527704 A | * | 12/2019 | |
| KR | 10-2017-0014309 A | | 2/2017 | |
| KR | 20170137997 A | * | 7/2018 | .......... H01M 2/1016 |
| KR | 20190041294 A | * | 4/2019 | ........ H01M 50/3425 |

OTHER PUBLICATIONS

Hong (translation) (Year: 2018).*
Kook (translation) (Year: 2019).*
Yoshitaka machine translation (Year: 2019).*
CN210443640U (translation) (Year: 2020).*
CN 110190211 A (translation) (Year: 2019).*

* cited by examiner

*Primary Examiner* — Matthew T Martin
*Assistant Examiner* — Paul Christian St Wyrough
(74) *Attorney, Agent, or Firm* — IP & T GROUP LLP

(57) ABSTRACT

A battery module includes: a plurality of secondary battery cells; and a housing unit having an internal space in which the plurality of secondary battery cells are accommodated and including a plate member extending a flame or gas path.

12 Claims, 9 Drawing Sheets

BATTERY MODULE

CROSS-REFERENCE TO RELATED APPLICATION(S)

This application claims benefit of priority to Korean Patent Application No. 10-2020-0027909 filed on Mar. 5, 2020 in the Korean Intellectual Property Office, the disclosure of which is incorporated herein by reference in its entirety.

BACKGROUND

1. Field

The present disclosure relates to a battery module.

2. Description of Related Art

As technological developments and demand for mobile devices, electric vehicles, and the like increase, demand for secondary battery cells as an energy source are rapidly increasing. A secondary battery cell is a battery that can be repeatedly charged and discharged because mutual conversion between chemical energy and electrical energy thereof is reversible.

Such a secondary battery cell includes an electrode assembly including a cathode, an anode, a separator, and an electrolyte, etc., a major component of the secondary battery, and a cell body member as a laminated film case protecting the electrode assembly.

In addition, a plurality of secondary battery cells may be mounted and installed as a battery module in an electric vehicle, an energy storage system (ESS), or the like.

However, the electrode assembly generates heat during a charging or discharging process, and the generation of heat causes an increase in temperature, resulting in a deterioration in performance of the secondary battery cell.

In addition, an explosion of any one secondary battery cell due to internal factors of the battery module such as the increase in temperature of the secondary battery cell or an explosion of any one secondary battery cell due to an external shock may lead to successive explosions of other secondary battery cells in the battery module.

Furthermore, thermal propagation, flame or high-temperature and high-pressure gas, and the like caused by the explosion of any one battery module may affect another, adjacent battery module, leading to a much greater problem of successive explosions of battery modules.

Therefore, in order to solve the above-described problems or limitations, it has been required to research battery modules.

RELATED ART DOCUMENT (Patent Document 1) KR 10-2017-0014309 A (Feb. 8, 2017)

SUMMARY

An aspect of the present disclosure may provide a battery module with an improvement with respect to a problem that an explosion of any one battery module causes a successive explosion in another, adjacent battery module.

Another aspect of the present disclosure may provide a battery module capable of dissipating a flame and/or gas generated by an explosion of any one battery module.

According to an aspect of the present disclosure, a battery module may include: a plurality of secondary battery cells; and a housing unit having an internal space in which the plurality of secondary battery cells are accommodated and including a plate member extending a flame or gas path.

The plate member may include: a first plate portion disposed on one side thereof; a second plate portion disposed to be spaced apart from the first plate portion at a predetermined interval to form a hollow portion between the first plate portion and the second plate portion; and a core portion provided in the hollow portion and forming the flame or gas path.

The core portion may be formed in a pattern in which a unit column portion in a form of a hollow polygonal column is repeated.

The unit column portion may have opening portions formed in at least two column surfaces thereof.

The unit column portion may have a first opening portion formed adjacent to the first plate portion and a second opening portion formed adjacent to the second plate portion to form the flame or gas path in a zigzag form.

The second plate portion may have an entrance portion formed to allow the hollow portion to communicate with the internal space in which the secondary battery cells are accommodated.

The plate member includes an opening/closing plate portion connected to the second plate portion and opening or closing the entrance portion.

The opening/closing plate portion may be formed to be broken by heat or pressure caused by an explosion of any one of the secondary battery cells.

One end of the opening/closing plate portion may be hinge-coupled to the second plate portion so that the opening/closing plate portion is rotated in a direction toward the hollow portion by pressure caused by an explosion of any one of the secondary battery cells to open the entrance portion.

The plate member may include an accommodation member accommodated in the hollow portion and formed of a material for performing at least one of an extinguishing function, a heat absorption function, and a fire resistance function.

The first plate portion may have a discharge portion formed to discharge a flame or gas entering the hollow portion to the outside of the hollow portion.

The housing unit may include: a bottom member on which the plurality of secondary battery cells are seated; sidewall members provided at edges of the bottom member; and a cover member provided on upper ends of the sidewall member, and the plate member may be provided for at least one of the bottom member, the sidewall members, and the cover member.

The housing unit may include a partition member disposed in the internal space to divide the internal space, and the plate member may be provided for the partition member.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

The present disclosure relates to a battery module with an improvement with respect to a problem that an explosion of any one battery module causes a successive explosion in another, adjacent battery module. That is, the present disclosure is provided to prevent thermal runaway of any one battery module from leading to thermal propagation to another battery module.

In another aspect, the present disclosure relates to a battery module capable of dissipating a flame generated by an explosion of any one battery module, and securing structural rigidity in shock and vibration environments while achieving weight reduction.

Figure 1:
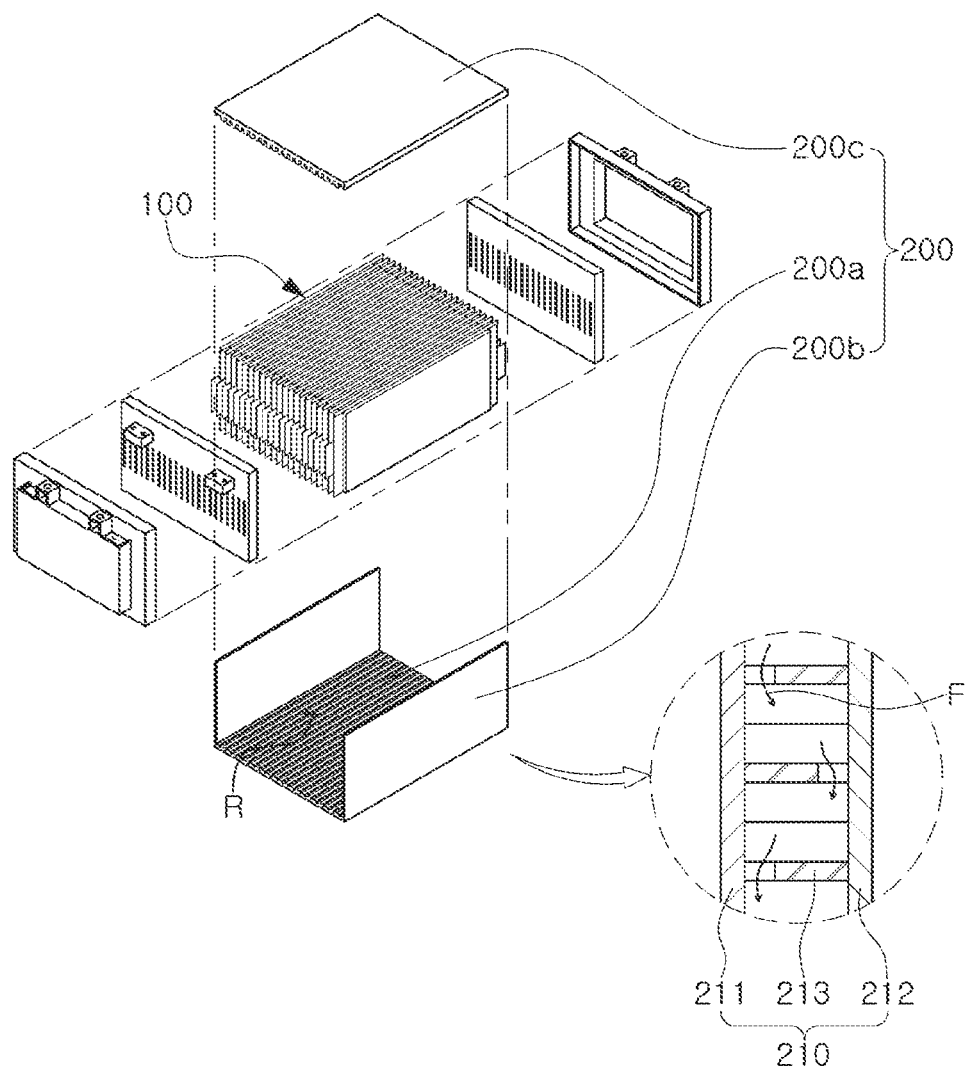
FIG. 1 is an exploded perspective view illustrating a battery module according to the present disclosure.
Figure 2:
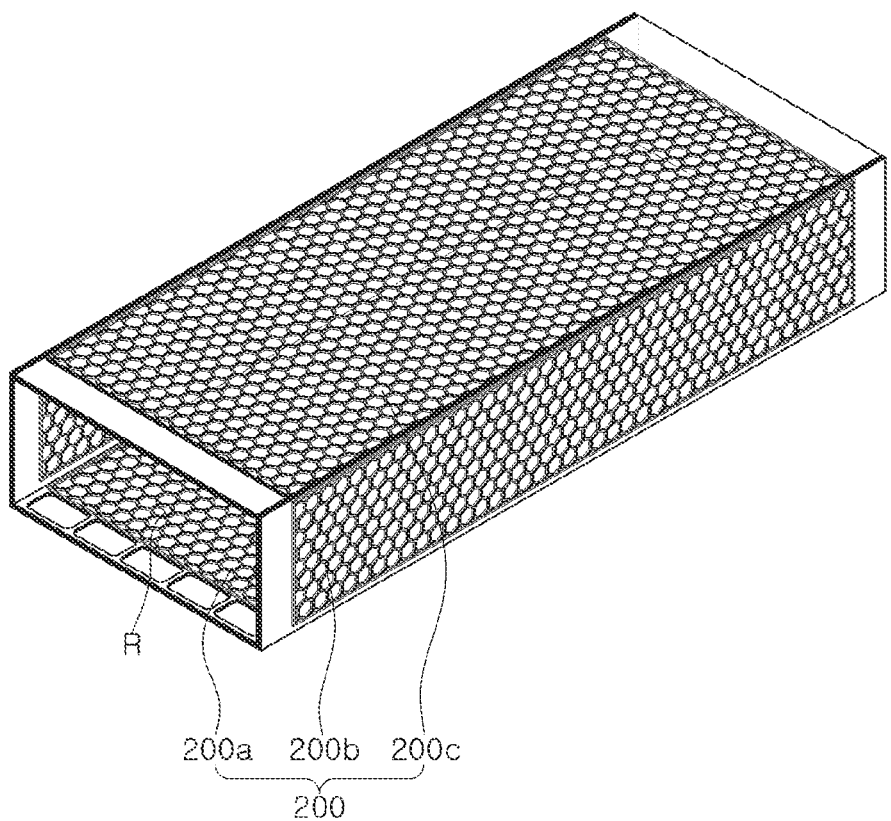
FIG. 2 is a cutaway view illustrating a portion of a first plate portion of a plate member provided for a housing unit in the battery module according to the present disclosure.

Specifically, referring to the drawings, FIG. 1 is an exploded perspective view illustrating a battery module according to the present disclosure, and FIG. 2 is a cutaway view illustrating a portion of a first plate portion 211 of a plate member 210 provided for a housing unit 200 in the battery module according to the present disclosure.

Figure 3:
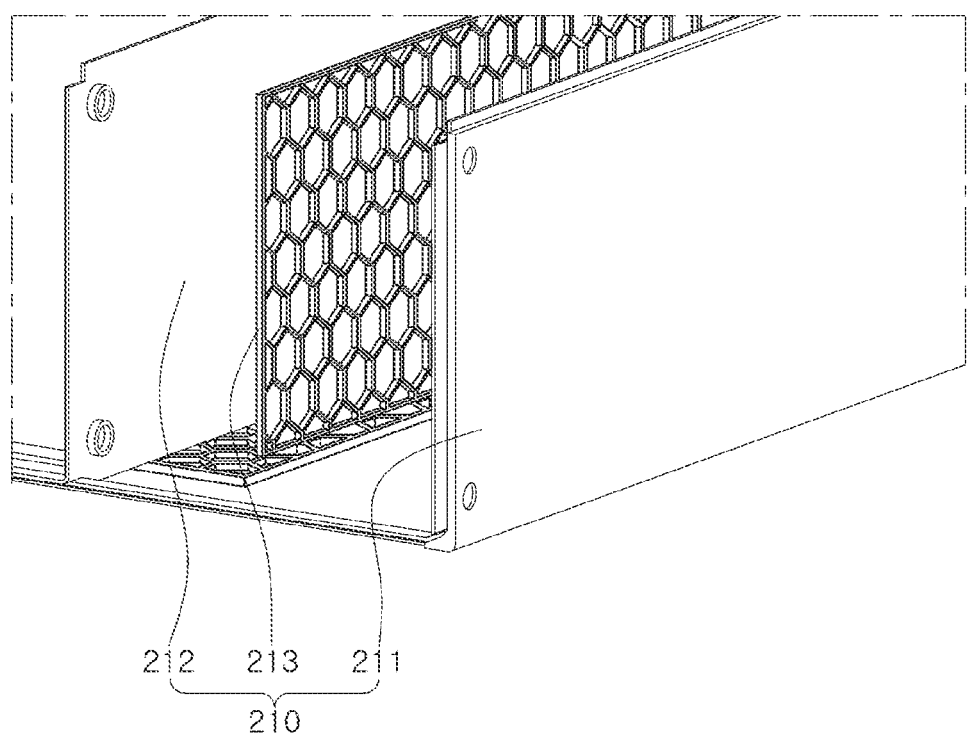
FIG. 3 is a cutaway view illustrating a portion of a first plate portion of a plate member provided for a bottom member and sidewall members of the housing unit in the battery module according to the present disclosure.
Figure 4:
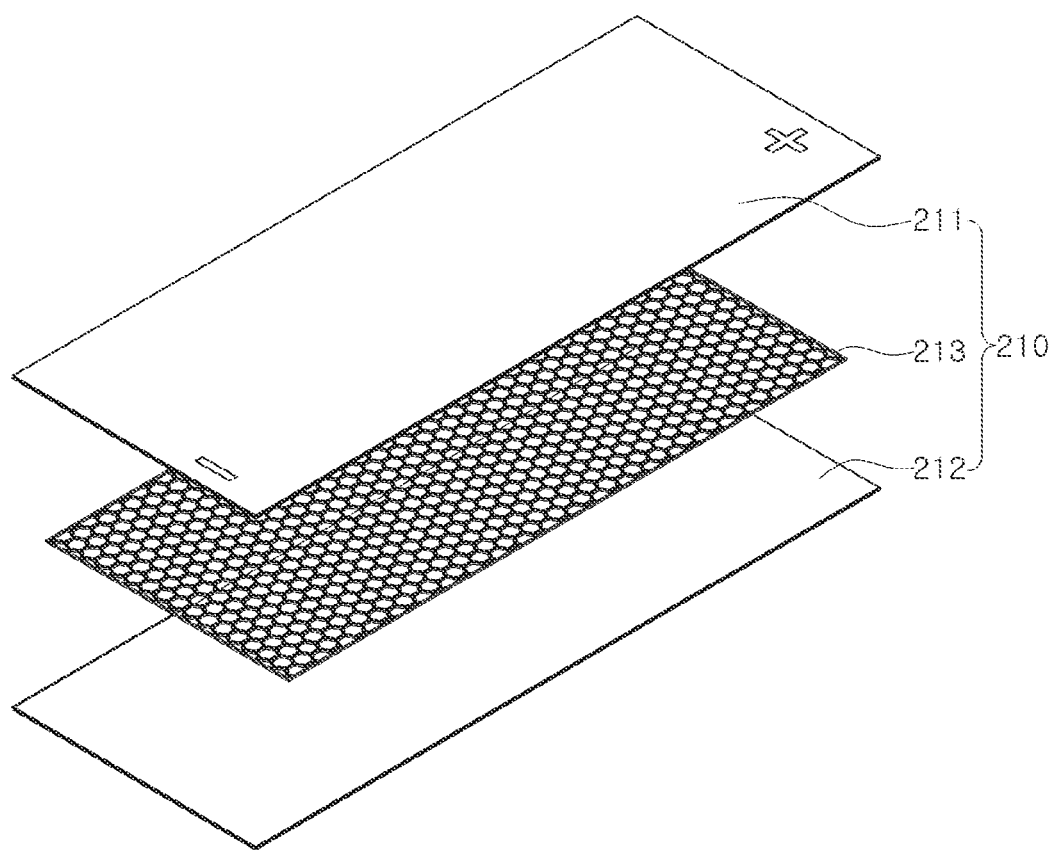
FIG. 4 is a cutaway view illustrating a portion of a first plate portion of a plate member provided for a cover member of the housing unit in the battery module according to the present disclosure.

In addition, FIG. 3 is a cutaway view illustrating a portion of a first plate portion 211 of a plate member 210 provided for a bottom member 200a and sidewall members 200b of the housing unit 200 in the battery module according to the present disclosure, and FIG. 4 is a cutaway view illustrating a portion of a first plate portion 211 of a plate member 210 provided for a cover member 200c of the housing unit 200 in the battery module according to the present disclosure.

Referring to FIGS. 1 through 4, a battery module according to an exemplary embodiment of the present disclosure may include: a plurality of secondary battery cells 100; and a housing unit 200 having an internal space R in which the plurality of secondary battery cells 100 are accommodated and including a plate member 210 extending a flame or gas path F.

In this way, the battery module according to the present disclosure may be configured to dissipate a flame and/or gas generated by the secondary battery cell 100 disposed in the internal space R through the extended flame or gas path.

That is, in the battery module according to the present disclosure, since the flame and/or gas is dissipated before discharged to the outside, it is possible to prevent a problem that the flame propagates to another neighboring battery module, causing a successive explosion.

The dissipation of the flame results from the path extended to decrease a temperature of the flame and deplete oxygen so that flame retention conditions may be eliminated.

Here, a plurality of secondary battery cells 100 may be accommodated in the internal space R of the housing unit 200.

In addition, the secondary battery cell 100 may include an electrode assembly and a cell body member surrounding the electrode assembly.

The electrode assembly may substantially include an electrolyte, and the electrolyte may be accommodated in the cell body member and used together with the electrode assembly. The electrolyte may include a lithium salt, such as $LiPF_6$ or $LiBF_4$, in an organic solvent, such as ethylene carbonate (EC), propylene carbonate (PC), diethyl carbonate (DEC), ethyl methyl carbonate (EMC), or dimethyl carbonate (DMC). Furthermore, the electrolyte may be in a liquid, solid or gel phase.

In addition, the cell body member is a component protecting the electrode assembly while accommodating the electrolyte therein. As an example, the cell body member may be provided as a pouch-type member or a can-type member. Here, the pouch-type member, accommodating the electrode assembly therein while sealing the electrode assembly on three sides thereof, may be a component configured to seal the electrode assembly by overlapping and bonding the pouch-type member on three sides of the electrode assembly, usually an upper side and both lateral sides except one side that is a lower side, in a state where the electrode assembly is accommodated in the pouch-type member. Also, the can-type member, accommodating the electrode assembly therein while sealing the electrode assembly on one side thereof, may be a component configured to seal the electrode assembly by overlapping and bonding the can-type member on one side of the electrode assembly, usually an upper surface except for three sides that are a lower side and both lateral sides, in a state where the electrode assembly is accommodated in the can-type member.

However, the pouch-type secondary battery cell 100 or the can-type secondary battery cell 100 is merely an example of the secondary battery cell 100 accommodated in the battery module according to the present disclosure, and the secondary battery cell 100 accommodated in the battery module according to the present disclosure is not limited to the above-described type.

The housing unit may serve as a body of the battery module in which the plurality of secondary battery cells 100 are accommodated.

That is, the housing unit, which is a component in which the plurality of secondary battery cells are installed, may serve to not only protect the secondary battery cells but also transfer electrical energy generated by the secondary battery cells to the outside or transfer electrical energy from the outside to the secondary battery cells.

To this end, the housing unit may include a bottom member 200a, sidewall members 200b, and a cover member 200c that form the internal space R for accommodating the plurality of secondary battery cells 100. The plate member 210 extending the flame or gas path F may be provided for the bottom member 200a, the sidewall members 200b, the cover member 200c, or the like.

Accordingly, it is possible to reduce a rate at which a flame caused by an explosion generated by the secondary battery cell 100 accommodated in the internal space R of the housing unit is discharged to the outside through the bottom member 200a, the sidewall members 200b, the cover member 200c, or the like. The reduction in the rate at which the flame is discharged to the outside of the housing unit may solve the problem that the flame propagates to another neighboring battery module, which results in a successive explosion.

To this end, the plate member 210 of the battery module according to an exemplary embodiment of the present disclosure may specifically include: a first plate portion 211 disposed on one side thereof; a second plate portion 212 disposed to be spaced apart from the first plate portion 211 at a predetermined interval to form a hollow portion H between the first plate portion 211 and the second plate portion 212; and a core portion 213 provided in the hollow portion H and forming a flame or gas path F.

That is, the bottom member 200a, the sidewall members 200b, or the cover member 200c may be formed of the plate member 210 itself, and the plate member 210 may include the first plate portion 211, the second plate portion 212, and the core portion 213.

As an example, when the sidewall member 200b is formed of the plate member 210, the first plate portion 211 may be disposed on one side thereof that is exposed to the outside, and the second plate portion 212 may be disposed inward of the first plate portion 211 to be closer to the secondary battery cells 100 than the first plate portion 211. That is, both end portions of the second plate portion 212 may be at least partially coupled to the first plate portion 211, and a middle portion of the second plate portion 212 may be disposed to be spaced apart from the first plate portion 211 at a predetermined distance while being disposed to be closer to the secondary battery cells 100 than the first plate portion 211.

In addition, the core portion 213 may be disposed in the hollow portion H formed between the first plate portion 211 and the second plate portion 212 disposed to be spaced apart from each other at the predetermined interval. In addition, the core portion 213 may be formed in a structure to extend a path of a flame entering the hollow portion H.

That is, the core portion 213 of the battery module according to an exemplary embodiment of the present disclosure may be formed in a pattern in which a unit column portion 213a in a form of a hollow polygonal column is repeated.

In this way, the core portion 213 may be configured to extend the flame or gas path F through a plurality of unit column portions 213a, because the flame moves while passing through the unit column portions 213a.

As an example, the core portion 213 may be configured to extend the flame or gas path by forming opening portions 213b in the unit column portion 213a. This will be described in detail later with reference to FIG. 5.

Further, the second plate portion 212 may have an entrance portion 212a formed to allow the flame to enter the hollow portion H, and the first plate portion 211 may have a discharge portion 211a formed to discharge the flame, gas, or the like entering the hollow portion H. This will be described in detail later with reference to FIG. 6.

In addition, since the core portion 213 is disposed in the hollow portion H between the first plate portion 211 and the second plate portion 212, the core portion 213 may also serve to support the first plate portion 211 and the second plate portion 212. Accordingly, the plate member 210 may secure structural rigidity in shock and vibration environments while making it possible to achieve weight reduction.

The housing unit may include a bottom member 200a, sidewall members 200b, and a cover member 200c, which form an internal space R for accommodating the plurality of secondary battery cells 100, while being provided as a plate member 210 extending a flame or gas path F.

That is, the housing unit 200 of the battery module according to an exemplary embodiment of the present disclosure may include a bottom member 200a on which the plurality of secondary battery cells 100 are seated, sidewall members 200b provided at edges of the bottom member 200a, and a cover member 200c provided on upper ends of the sidewall member 200b, and the plate member 210 may be provided for at least one of the bottom member 200a, the sidewall members 200b, and the cover member 200c.

The bottom member 200a, on which the plurality of secondary battery cells 100 are seated, may serve to support the plurality of secondary battery cells 100 seated thereon.

Here, the bottom member 200a may be configured to transfer heat generated by the secondary battery cells 100 to an external heat sink to cool the battery module.

Also, the sidewall member 200b forming a side portion of the housing unit may discharge heat generated by the secondary battery cells 100 to the outside.

The housing unit may be configured to protect upper ends of the secondary battery cells by including the cover member 200c provided on the upper ends of the sidewall members 200b. In addition, the housing unit may include a front member and a rear member neighboring to the sidewall members 200b. Thus, the housing unit may be configured to surround the plurality of secondary battery cells 100.

Additionally, the housing unit may be provided with a supplemental component such as bus bar members electrically connecting the secondary battery cells to the outside.

Also, compression members may be provided on inner side surfaces of the sidewall members 200b to further securely protect the secondary battery cells 100.

In addition, at least one of the bottom member 200a, the sidewall members 200b, and the cover member 200c may be provided as the plate member 210 extending the flame or gas path F to induce dissipation of the flame. Accordingly, it is possible to solve a problem that a flame generated by any one battery module spreads to another neighboring battery module, causing a successive explosion.

Figure 5:
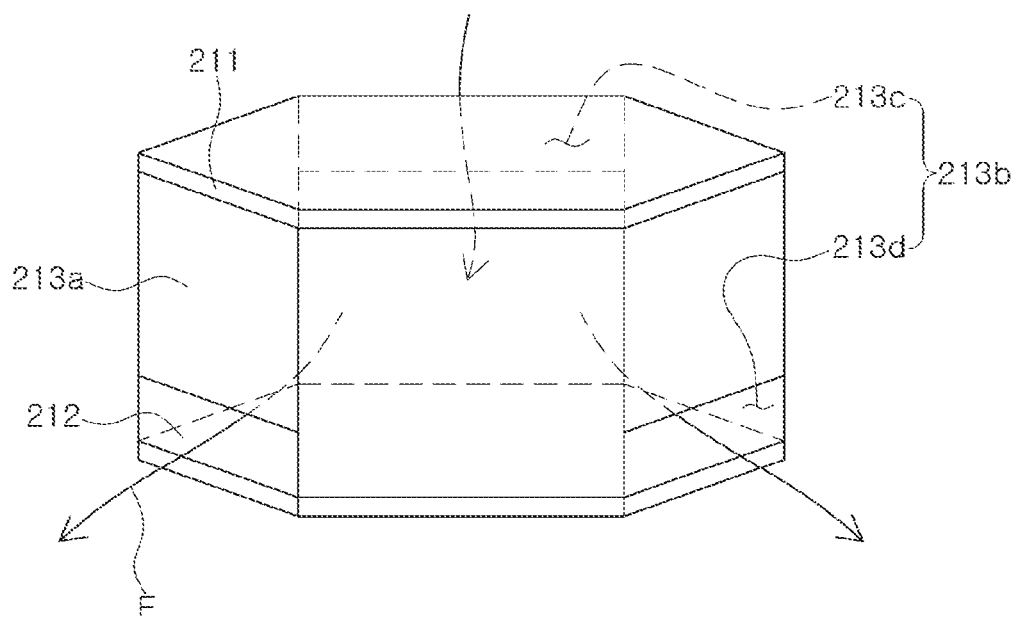
FIG. 5 is a perspective view illustrating a unit column portion of a core portion in the battery module according to the present disclosure.

FIG. 5 is a perspective view illustrating the unit column portion 213a of the core portion 213 in the battery module according to the present disclosure. Referring to FIG. 5, the unit column portion 213a of the battery module according to an exemplary embodiment of the present disclosure may have opening portions 213b formed in at least two column surfaces thereof.

Accordingly, a flame, gas, or the like introduced into the unit column portion 213a of the core portion 213 may spread to another neighboring unit column portion 213a. As a result, it is possible to extend a flow path of the flame, gas, or the like entering the core portion 213.

In addition, the unit column portion 213a of the battery module according to an exemplary embodiment of the present disclosure may have a first opening portion 213c formed adjacent to the first plate portion 211 and a second opening portion 213d formed adjacent to the second plate portion 212 to form the flame or gas path in a zigzag form.

When the opening portions 213b are formed in such a form, the flow path of the flame, gas, or the like may further be extended, and an indirect cooling effect may also be caused. Accordingly, it is possible to increase the flame dissipation effect and form the gas at a relatively low temperature.

As an example, the flame, gas, or the like may enter the unit column portion 213a through the first opening portion 213c, and the flame, gas, or the like may be discharged to another neighboring unit column portion 213a through the second opening portion 213d, thereby extending the flow path of the flame, gas, or the like.

In addition, if the first opening portion 213c is a hole formed adjacent to the first plate portion 211, and the second opening portion 213d is a hole formed adjacent to the second plate portion 212, the flame, gas, or the like may penetrate through the unit column portions 213a on a plane horizontal to the first plate portion 211 or the second plate portion 212, in a state where the flow path is secured in directions intersecting with the plane, thereby further extending the flow path of the flame, gas, or the like in a zigzag form.

In addition, when the first plate portion 211 or the second plate portion 212 is disposed adjacent to the outside, which is in a relatively low temperature environment, the flame, gas, or the like may be cooled while passing through the first opening portion 213c or the second opening portion 213d.

Figure 6:
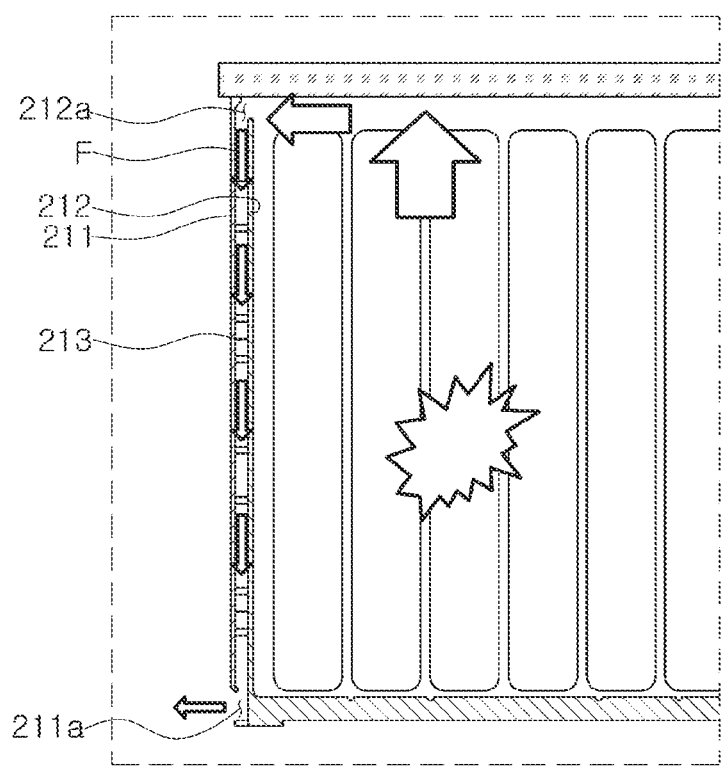
FIG. 6 is a side cross-sectional view illustrating the plate member provided for the sidewall member of the battery module according to the present disclosure.

FIG. 6 is a side cross-sectional view illustrating the plate member 210 provided for the sidewall member 200b of the battery module according to the present disclosure. Referring to FIG. 6, the second plate portion 212 of the battery module according to an exemplary embodiment of the present disclosure may have an entrance portion 212a formed to allow the hollow portion H to communicate with the internal space R in which the secondary battery cells 100 are accommodated.

Accordingly, the flame generated by the secondary battery cell 100 accommodated in the internal space R may enter the hollow portion H of the plate member 210. Thus, the flow path of the flame, gas, or the like may be extended through the core portion 213 disposed in the hollow portion H.

The entrance portion 212a may be further provided with an opening/closing plate portion 214 opening or closing the entrance portion 212a. This will be described in detail later with reference to FIG. 7.

In addition, the first plate portion 211 of the battery module according to an exemplary embodiment of the present disclosure may have a discharge portion 211a formed to discharge the flame or gas entering the hollow portion H to the outside of the hollow portion H.

Accordingly, if some of the flame entering the hollow portion H, gas, or the like is not dissipated, the flame, gas, or the like may be discharged through the discharge portion 211a.

In addition, when the first plate portion 211 is disposed to contact the outside, if the secondary battery cell 100 accommodated in the internal space R of the housing unit 200 explodes, then the internal space R is in a high-pressure environment, as compared with a relatively low-pressure environment outside. Accordingly, high-pressure gas or the like inside the internal space R may be induced to move to the outside, which is in the low-pressure environment, through the plate member 210. Therefore, the flame generated by the internal space R may also be induced to pass through the plate member 210.

Figure 7:
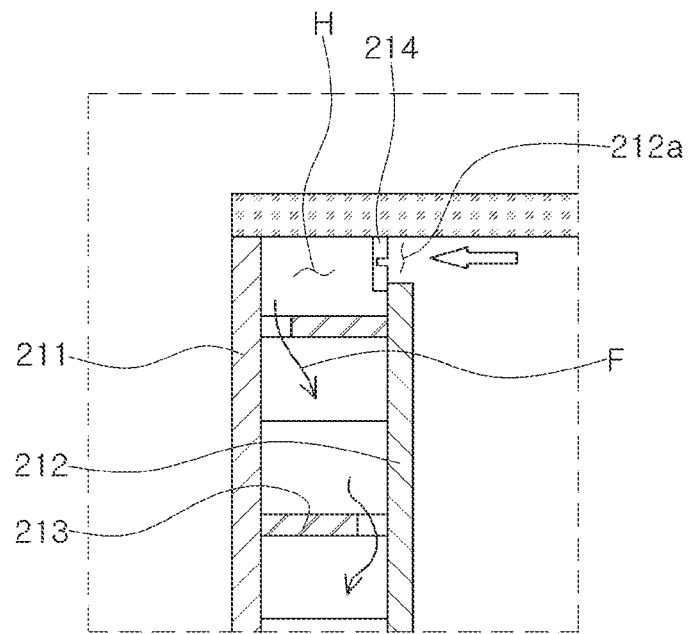
FIG. 7 is a side cross-sectional view illustrating an exemplary embodiment in which an opening/closing plate portion of the plate member is formed to be broken by heat or pressure caused by an explosion of a secondary battery cell in the battery module according to the present disclosure.

FIG. 7 is a side cross-sectional view illustrating an exemplary embodiment in which an opening/closing plate portion 214 of the plate member 210 is formed to be broken by heat or pressure caused by an explosion of a secondary battery cell 100 in the battery module according to the present disclosure. Referring to FIG. 7, the plate member 210 of the battery module according to an exemplary embodiment of the present disclosure may include an opening/closing plate portion 214 connected to the second plate portion 212 and opening or closing the entrance portion 212a.

By means of the opening/closing plate portion 214 as described above, it is possible to prevent a problem that external foreign substances flowing backward enter the internal space R through the plate member 210.

In addition, in order to induce a flame, gas, or the like, which is generated when a secondary battery cell 100 accommodated in the internal space R explodes, to the plate member 210, the opening/closing plate portion 214 needs to open the entrance portion 212a when the secondary battery cell 100 explodes.

To this end, the opening/closing plate portion 214 of the battery module according to an exemplary embodiment of the present disclosure may be formed to be broken by heat or pressure caused by an explosion of any one of the secondary battery cells 100.

In other words, the opening/closing plate portion 214 may be formed to be melted and broken by the heat caused by the explosion of the secondary battery cell 100 to open the entrance portion 212a, or configured to be cracked and broken by high-pressure gas caused by the explosion of the secondary battery cell 100 to open the entrance portion 212a.

As an example, as illustrated in FIG. 7, the opening/closing plate portion 214 may have a groove formed in a portion thereof, such that the groove portion is formed to be more vulnerable to high-pressure gas than the other portion.

Alternatively, the opening/closing plate portion 214 may be provided in a form of a door that is opened or closed. This will be described in detail later with reference to FIG. 8.

Figure 8:
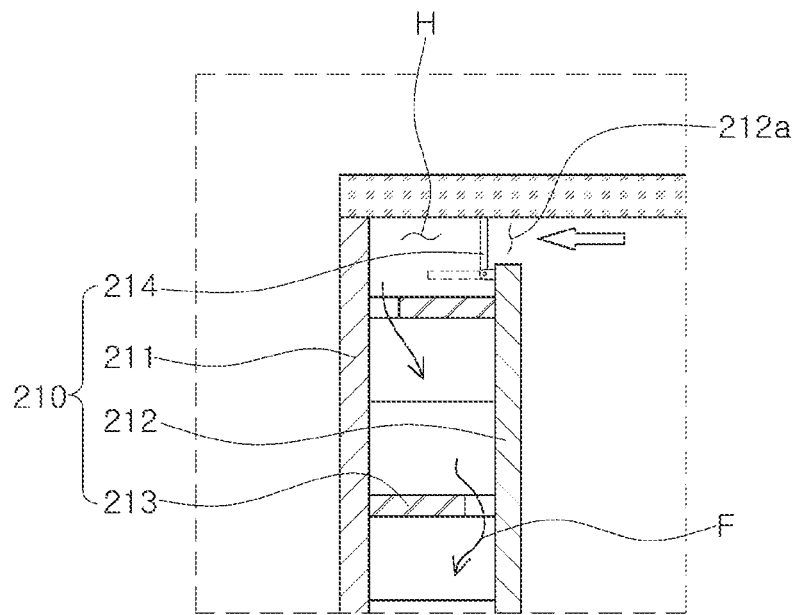
FIG. 8 is a side cross-sectional view illustrating an exemplary embodiment in which an opening/closing plate portion of the plate member is formed to be rotated by pressure caused by an explosion of a secondary battery cell in the battery module according to the present disclosure.

FIG. 8 is a side cross-sectional view illustrating an exemplary embodiment in which an opening/closing plate portion 214 of the plate member 210 is formed to be rotated by pressure caused by an explosion of a secondary battery cell 100 in the battery module according to the present disclosure. Referring to FIG. 8, one end of the opening/closing plate portion 214 of the battery module according to an exemplary embodiment of the present disclosure may be hinge-coupled to the second plate portion 212 so that the opening/closing plate portion 214 is rotated in a direction toward the hollow portion H by pressure caused by an explosion of any one of the secondary battery cells 100 to open the entrance portion 212a.

That is, the opening/closing plate portion 214 may be configured to be broken by the heat or pressure caused by the explosion of the secondary battery cell 100 to open the entrance portion 212a, but may also be configured in the form of the door to open the entrance portion 212a.

To this end, one end of the opening/closing plate portion 214 may be hinge-coupled to the second plate portion 212 to rotate the opening/closing plate portion 214, and an elastic member imparting a predetermined elastic force in a direction to close the entrance portion 212a may be connected to one end of the opening/closing plate portion 214.

Accordingly, when the secondary battery cell 100 accommodated in the internal space R explodes and thereby the internal space R is in a high-pressure environment, the opening/closing plate portion 214 may be rotated in a direction to open the entrance portion 212a.

Figure 9:
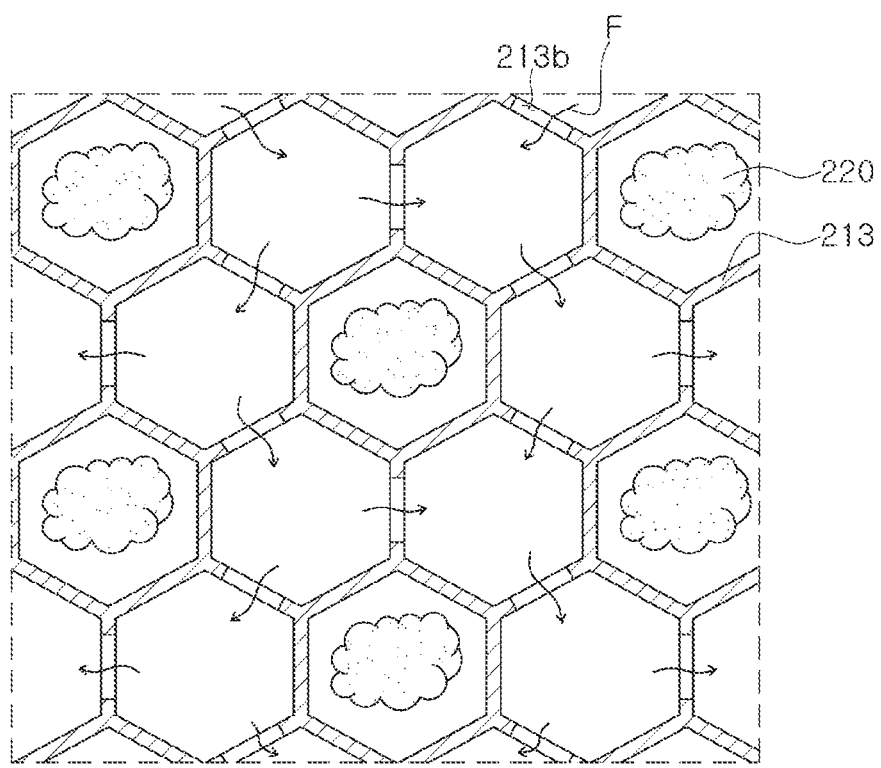
FIG. 9 is a front cross-sectional view illustrating an exemplary embodiment in which the plate member is provided with an accommodation member in the battery module according to the present disclosure.

FIG. 9 is a front cross-sectional view illustrating an exemplary embodiment in which the plate member 210 is provided with an accommodation member 220 in the battery module according to the present disclosure. Referring to FIG. 9, the plate member 210 of the battery module according to an exemplary embodiment of the present disclosure may include an accommodation member 220 accommodated in the hollow portion H and formed of a material for performing at least one of an extinguishing function, a heat absorption function, and a fire resistance function.

Accordingly, when the first plate portion 211 or the second plate portion 212 disposed adjacent to the internal space R is melted by the heat or flame, the accommodation member 220 may serve at least one of the extinguishing function, the heat absorption function, and the fire resistance function while directly contacting the heat and flame.

Figure 10:
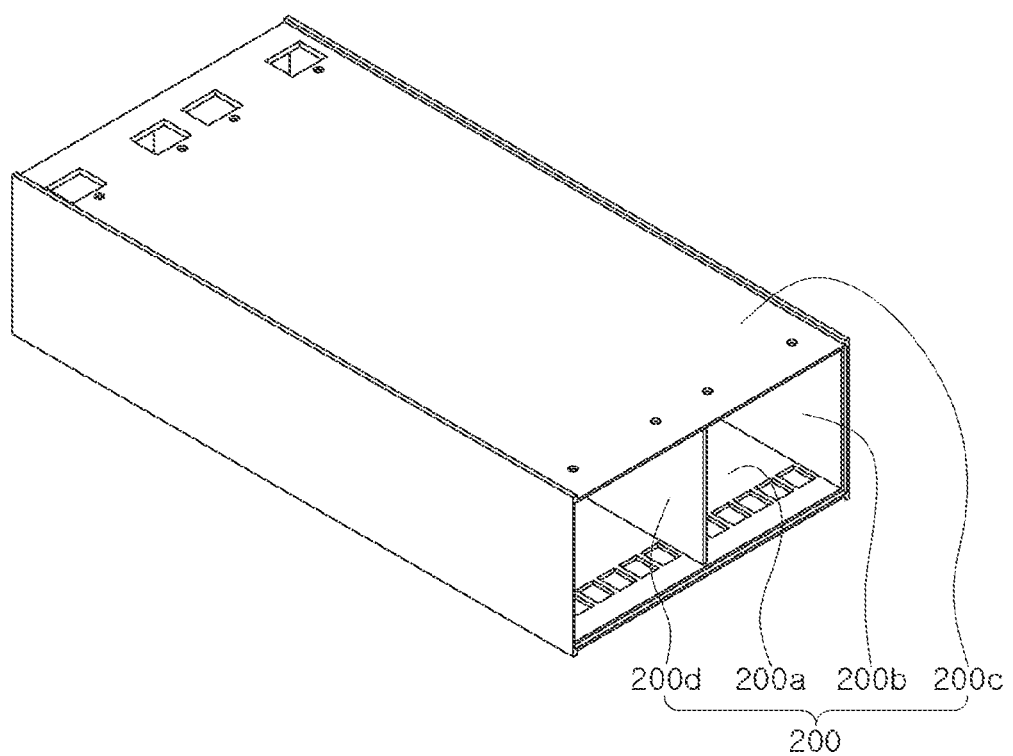
FIG. 10 is a perspective view illustrating an exemplary embodiment in which the housing unit includes a partition member in the battery module according to the present disclosure.

FIG. 10 is a perspective view illustrating an exemplary embodiment in which the housing unit 200 includes a partition member 200d in the battery module according to the present disclosure. Referring to FIG. 10, the housing unit 200 of the battery module according to an exemplary embodiment of the present disclosure may include a partition member 200d disposed in the internal space R to divide the internal space R, and the plate member 210 may be provided for the partition member 200d.

That is, the partition member 200d may be provided so that an explosion of a secondary battery cell 100 occurring on one side of the internal space R of the housing unit 200 does not spread to the other side of the internal space R of the housing unit 200.

As an example, as illustrated in FIG. 10, the partition member 200d may be provided at a center portion of the internal space R to divide the internal space R into two spaces.

Accordingly, it is possible to solve a problem that an explosion of a secondary battery cell 100 accommodated in one side of the internal space R spreads to another secondary battery cell 100 accommodated in the other side of the internal space R.

As set forth above, according to exemplary embodiments of the present disclosure, the battery module according to the present disclosure is advantageous in that it is possible to solve a problem that an explosion of any one battery module causes a successive explosion in another, adjacent battery module.

That is, the battery module according to the present disclosure is effective in preventing thermal runaway of any one battery module from leading to thermal propagation to another battery module.

Further, the battery module according to the present disclosure is advantageous in that it is possible to dissipate a flame generated by an explosion of any one battery module.

In addition, the battery module according to the present disclosure is advantageous in that it is possible to secure structural rigidity in shock and vibration environments while achieving weight reduction.

While exemplary embodiments have been shown and described above, it will be apparent to those skilled in the art that modifications and variations could be made without departing from the scope of the present invention as defined by the appended claims.

What is claimed is:

1. A battery module comprising:
a plurality of secondary battery cells; and
a housing unit having an internal space in which the plurality of secondary battery cells are accommodated and including a plate member extending a flame or gas path,
wherein the plate member includes:
a first plate portion and a second plate portion facing each other in a first direction; and
a core portion comprising a plurality of unit column portions disposed between the first plate portion and the second plate portion and an opening portion formed on each of the plurality of unit column, the plurality of unit column portions disposed in a direction perpendicular to the first direction and communicated with each other through the opening portion,
wherein the plurality of unit column portions comprises:
a first unit column portion communicated with the flame or gas path;
a plurality of second unit column portions disposed along a circumference of the first unit column portion; and
a plurality of third unit column portion disposed along a circumference of each of the plurality of second unit column portion,
wherein the first unit column portion has an opening portion communicating with the plurality of second unit column portions, and wherein each of the plurality of second column portions has an opening portion communicating with the plurality of third unit column potions, and
wherein the opening portion of the first column portion and the opening portion of each of the plurality of second column portions are formed on each surface not to face each other in the direction perpendicular to the first direction to dissipate a flame or gas.

2. The battery module of claim 1, wherein
at least one of the plurality of unit column portion is provided in the form of a hollow polygonal column, and is configured to form the flame or gas path.

3. The battery module of claim 1, wherein the core portion is formed in a pattern in which the plurality of unit column portions are repeated.

4. The battery module of claim 1, wherein the opening portion is formed on a column surface of each of the plurality of unit column portions.

5. The battery module of claim 1, wherein the opening portion of the first unit column portion is formed adjacent to the first plate portion and the opening portion of each of the second unit column portions is formed adjacent to the second plate portion to form the flame or gas path in a zigzag form.

6. The battery module of claim 1, wherein the plate member includes an opening/closing plate portion connected to the second plate portion and opening or closing an entrance portion formed on the second plate portion to communicate the core portion with the internal space.

7. The battery module of claim 6, wherein the opening/closing plate portion is formed to be broken by heat or pressure caused by an explosion of any one of the secondary battery cells.

8. The battery module of claim 6, wherein one end of the opening/closing plate portion is hinge-coupled to the second plate portion so that the opening/closing plate portion is rotated by pressure caused by an explosion of any one of the secondary battery cells to open the entrance portion.

9. The battery module of claim 1, wherein the plate member includes an accommodation member accommodated in at least one of the plurality of unit column portions and formed of a material for performing at least one of an extinguishing function, a heat absorption function, and a fire resistance function.

10. The battery module of claim 1,
wherein the first plate portion disposed to expose to outside of the housing portion, and the second plate portion faces the internal space.

11. The battery module of claim 1, wherein the housing unit includes:
a bottom member on which the plurality of secondary battery cells are seated;
sidewall members provided at edges of the bottom member; and
a cover member provided on upper ends of the sidewall members, and
the plate member is provided for at least one of the bottom member, the sidewall members, and the cover member.

12. The battery module of claim 1, wherein the housing unit includes a partition member disposed in the internal space to divide the internal space, and
the plate member is provided for the partition member.

* * * * *